US012339933B2

(12) United States Patent
Masampally et al.

(10) Patent No.: US 12,339,933 B2
(45) Date of Patent: Jun. 24, 2025

(54) METHOD AND SYSTEM FOR GETTING DESIRED PROPERTY OF BLEND BY OPTIMIZING BLENDING RULES

(71) Applicant: Tata Consultancy Services Limited, Mumbai (IN)

(72) Inventors: Vishnu Swaroopji Masampally, Pune (IN); Aditya Pareek, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 461 days.

(21) Appl. No.: 18/080,054

(22) Filed: Dec. 13, 2022

(65) Prior Publication Data

US 2023/0195853 A1 Jun. 22, 2023

(30) Foreign Application Priority Data

Dec. 16, 2021 (IN) .............................. 202121058609

(51) Int. Cl.
| | |
|---|---|
| *G05B 13/04* | (2006.01) |
| *G06F 18/10* | (2023.01) |
| *G06F 18/24* | (2023.01) |

(52) U.S. Cl.
CPC ..... *G06F 18/24765* (2023.01); *G05B 13/042* (2013.01); *G06F 18/10* (2023.01)

(58) Field of Classification Search
USPC ......................................................... 700/28
See application file for complete search history.

(56) References Cited

U.S. PATENT DOCUMENTS

| 9,624,448 B2 | 4/2017 | Joo et al. |
| 2008/0086283 A1* | 4/2008 | Yuan ..................... G05B 23/024 |
| | | 702/181 |

(Continued)

FOREIGN PATENT DOCUMENTS

EP  3 517 952 A1  7/2019

OTHER PUBLICATIONS

WO_2021019551_A1 (Year: Feb. 2021).*

(Continued)

*Primary Examiner* — Hien D Khuu
(74) *Attorney, Agent, or Firm* — FINNEGAN, HENDERSON, FARABOW, GARRETT & DUNNER LLP

(57) ABSTRACT

The gasoline blending is a critical aspect in oil refinery operations. There are multiple blending rules in prior art to predict the chemical or physical property of the blend. But none of the prior method focuses on obtaining the best blending rule for each feature used in creating the soft-sensor. A method and system for generating a soft-sensor for getting desired property of a blend by optimizing a set of blending rules for each feature used for creating soft-sensor have been provided using data from individual components of the blend. The method comprises automated soft-sensor creation using multiple data sources. Further, the method involves finding best blending rule for each feature used for building the soft-sensor or the blending model to predict property of the blend. The soft-sensor developed using data of components used for blending is adapted to predict mixture or blend property with limited tuning.

16 Claims, 10 Drawing Sheets

(56) References Cited

U.S. PATENT DOCUMENTS

| | | | | |
|---|---|---|---|---|
| 2010/0250051 A1* | 9/2010 | Nestico | ............... | G05B 17/02 |
| | | | | 701/100 |
| 2016/0188843 A1* | 6/2016 | Staples, II | ............ | G16Z 99/00 |
| | | | | 705/2 |
| 2019/0040323 A1* | 2/2019 | Lee | ..................... | H10N 50/10 |
| 2021/0182351 A1* | 6/2021 | Shen | .................... | G06N 20/00 |

OTHER PUBLICATIONS

Dahmen et al., "Model-Based Formulation of Biofuel Blends by Simultaneous Product and Pathway Design," Energy Fuels, 31:4096-4121 (2017).

Jiao et al., "Machine learning prediction of hydrocarbon mixture lower flammability limits using quantitative structure-property relationship models," Proc Safety Prog., e12103 (2019).

Mohamadi-Baghmolaei et al., "Presenting decision tree for best mixing rules and Z-factor correlations and introducing novel correlation for binary mixtures," Petroleum, 2:289-295 (2016).

Pan et al., "Prediction of Lower Flammability Limits for Binary Hydrocarbon Gases by Quantitative Structure—Property Relationship Approach," Molecules, 24:748 (2019).

\* cited by examiner

METHOD AND SYSTEM FOR GETTING DESIRED PROPERTY OF BLEND BY OPTIMIZING BLENDING RULES

PRIORITY CLAIM

This U.S. patent application claims priority under 35 U.S.C. § 119 to: Indian Patent Application No. 202121058609, filed on 16 Dec. 2021. The entire contents of the aforementioned application are incorporated herein by reference.

TECHNICAL FIELD

The disclosure herein generally relates to the field of blending of multiple components to be used in a refinery, and, more particularly, to a method and system for getting desired property of a blend by optimizing a set of blending rules.

BACKGROUND

Oil refineries typically process a blend of crude oils rather than a single crude oil to ensure that an optimum product mix as required by markets, which varies from time to time, can be obtained at minimum costs. The gasoline blending is a critical aspect in oil refinery operations. The economic and operability benefits associated with obtaining better-quality and less expensive gasoline blends, and at the same time making a more effective use of the available resources, are numerous and significant.

Prediction of chemical and physical properties such as octane number of blend using blend composition is a common practice in refineries. There are large number of blending rules or blending laws in the literature for the same. However, each rule is specific to the type of data. For example, linear by volume (LbV) model was proposed in the literature where the blend property is a linear function of molar fractions of each component present in the blend. There is a wide range of such blending rules in the prior art to predict the chemical or physical property of the blend depending on the available data.

SUMMARY

Embodiments of the present disclosure present technological improvements as solutions to one or more of the above-mentioned technical problems recognized by the inventors in conventional systems. For example, in one embodiment, a system for getting desired property of a blend by optimizing a set of blending rules. The system comprises an input/output interface, one or more hardware processors, and a memory. The input/output interface configured to provide data from a plurality of data sources. The memory is in communication with the one or more hardware processors, wherein the one or more first hardware processors are configured to execute programmed instructions stored in the memory, to: extract relevant data from the collected data, wherein the relevant data comprises one or more of; preprocess the extracted relevant data, wherein the preprocessed data comprises clean data of a plurality of features, wherein the plurality of features is corresponding to a blend; select a set of features from the plurality of features using a plurality of feature selection techniques; create a plurality of soft-sensors for the desired blend property using the preprocessed data of the selected set of features, wherein the plurality of soft-sensors is used to predict the desired property of a plurality of components used for blending; select a soft-sensor from amongst the plurality of soft-sensors for the desired property of the plurality of components used for blending based on accuracy; provide a set of blending rules for each feature of the selected set of features; determine the best blending rule from amongst the set of blending rules corresponding to each feature of the selected set of features, wherein the best blending rule is obtained from data of the plurality of components used for blending such that the selected soft-sensor can be used to predict the desired blend property of mixture of components, wherein the best blending rule is determined using an optimization technique, the optimization technique comprises: predicting the blend property for each blending rule of the set of blending rules for each feature of the soft-sensor built for predicting the blend property of the components used in the blend, comparing the predicted blend property with the desired blend property, and minimizing an error in prediction of the blend property to select the best blending rule; and build the soft-sensor with the desired property using the best blending rule.

In another aspect, a method for getting desired property of a blend by optimizing a set of blending rules. Initially, data from a plurality of data sources is collected. A relevant data is then extracted from the collected data, wherein the relevant data comprises one or more of spectral data, quantitative structure data, chromatography data, functional group contribution data and a user defined data. Further, the extracted relevant data is preprocessed, wherein the preprocessed data comprises clean data of a plurality of features, wherein the plurality of features are corresponding to a blend. In the next step, a set of features is selected from the plurality of features using a plurality of feature selection techniques. Further, a plurality of soft-sensors is created for the desired blend property using the preprocessed data of the selected set of features, wherein the plurality of soft-sensors is used to predict the desired property of a plurality of components used for blending. A soft-sensor is then selected from amongst the plurality of soft-sensors for the desired property of the plurality of components used for blending based on accuracy. A set of blending rules is then provided for each feature of the selected set of features. In the next step, best blending rule is determined from amongst the set of blending rules corresponding to each feature of the selected set of features, wherein the best blending rule is obtained from data of components used for blending such that the selected soft-sensor can be used to predict the desired blend property of mixture of components, wherein the best blending rule is determined using an optimization technique, the optimization technique comprises: predicting the blend property for each blending rule of the set of blending rules for each feature of the soft-sensor built for predicting the blend property of the components used in the blend, comparing the predicted blend property with the desired blend property, and minimizing an error in prediction of the blend property to select the best blending rule and finally, the soft-sensor is built for the desired property using the best blending rule.

In yet another aspect, one or more non-transitory machine-readable information storage mediums comprising one or more instructions which when executed by one or more hardware processors cause getting desired property of a blend by optimizing a set of blending rules. Initially, data from a plurality of data sources is collected. A relevant data is then extracted from the collected data, wherein the relevant data comprises one or more of spectral data, quantitative structure data, chromatography data, functional group contribution data and a user defined data. Further, the extracted relevant data is preprocessed, wherein the preprocessed data comprises clean data of a plurality of features, wherein the plurality of features are corresponding to a blend. In the next step, a set of features is selected from the plurality of features using a plurality of feature selection techniques. Further, a plurality of soft-sensors is created for the desired blend property using the preprocessed data of the selected set of features, wherein the plurality of soft-sensors is used to predict the desired property of a plurality of components used for blending. A soft-sensor is then selected from amongst the plurality of soft-sensors for the desired property of the plurality of components used for blending based on accuracy. A set of blending rules is then provided for each feature of the selected set of features. In the next step, best blending rule is determined from amongst the set of blending rules corresponding to each feature of the selected set of features, wherein the best blending rule is obtained from data of components used for blending such that the selected soft-sensor can be used to predict the desired blend property of mixture of components, wherein the best blending rule is determined using an optimization technique, the optimization technique comprises: predicting the blend property for each blending rule of the set of blending rules for each feature of the soft-sensor built for predicting the blend property of the components used in the blend, comparing the predicted blend property with the desired blend property, and minimizing an error in prediction of the blend property to select the best blending rule and finally, the soft-sensor is built for the desired property using the best blending rule.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
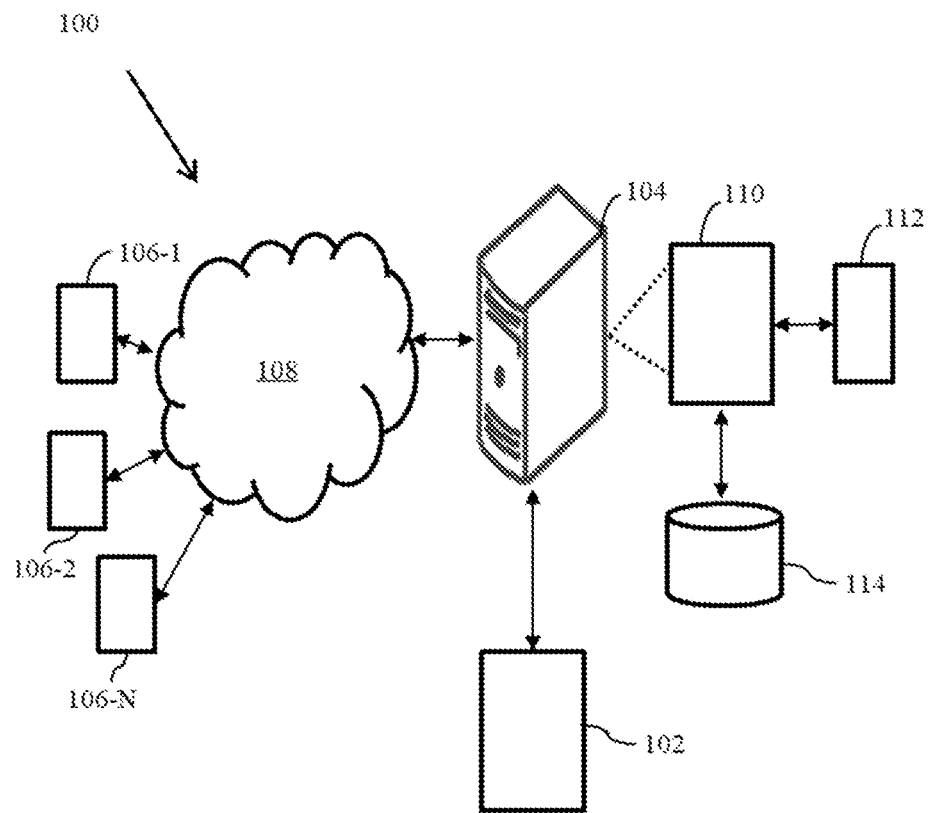
FIG. 1 illustrates a block diagram of a system for getting desired property of a blend by optimizing a set of blending rules according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The gasoline blending is a critical aspect in oil refinery operations. Prediction of chemical and physical properties such as octane number of blend using blend composition is a common practice in refineries. There is a wide range of such blending rules in the prior art to predict the chemical or physical property of the blend depending on the available data. But none of the prior method focuses on obtaining the best blending rule for each feature used in creating the soft-sensor.

The present disclosure herein provides a method and system for generating a soft-sensor for getting a desired property of a blend by optimizing a set of blending rules. It should be appreciated that the soft-sensor is nothing but a model for getting desired blend properties. For the sake of clarity, terms 'soft-sensor', 'model' or 'blending model' can be used interchangeable in the present disclosure. It should be appreciated that the terms 'blending rule' and the 'mixing rule' can be used interchangeably in the present disclosure. The disclosure provides generic platform for creating the soft-sensor of a desired mixture or blend property using data from individual components of the blend. The method comprises automated soft-sensor creation using multiple data sources (e.g. combining spectroscopic and molecular structural data). Further, the method involves finding best blending rule of each input (can be different for each input) used in building the soft-sensor that is used for predicting the property of a mixture or a blend. The inputs to the model are obtained from the data of the components that are used for mixing or blending. The input is also called as 'feature' in data science terminology and the components can be pure hydrocarbon, stream with mixture of hydrocarbons, etc. The soft-sensor developed using features extracted from the components used for blending is adapted to predict mixture or blend property with limited tuning.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

Figure 2:
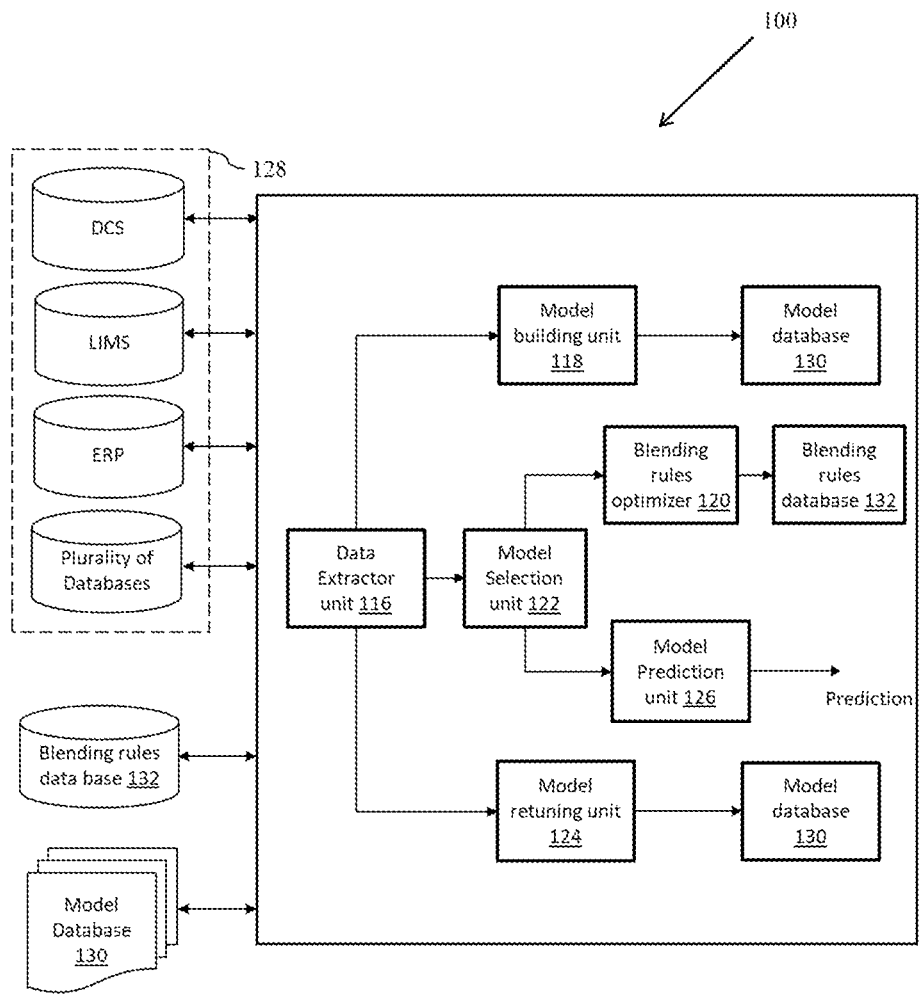
FIG. 2 is a functional block diagram of the system for getting desired property of the blend by optimizing the set of blending rules according to some embodiments of the present disclosure.

According to an embodiment of the disclosure, FIG. 1 illustrates a block diagram of a system for getting desired property of a blend by optimizing a set of blending rules. An architecture of the system 100 for getting desired property of a blend by optimizing a set of blending rules is shown in FIG. 2. The system 100 is in communication with a refinery 102. The property of the refinery comprises of one or more of Octane number, volatility (RVP), viscosity, flash point, an aniline point, and Sulphur content. The feed components used for blending to achieve the required property can be pure hydrocarbons, mixture of hydrocarbons, etc. Although the present disclosure is explained considering that the system 100 is implemented on a server, it may also be present elsewhere such as a local machine. It may be understood that the system 100 comprises one or more computing devices 104, such as a laptop computer, a desktop computer, a notebook, a workstation, a cloud-based computing environment and the like. It will be understood that the system 100 may be accessed through one or more input/output interfaces collectively referred to as I/O interface 106. Examples of the I/O interface 106 may include, but are not limited to, a user interface, a portable computer, a personal digital assistant, a handheld device, a smartphone, a tablet computer, a workstation and the like. The I/O interface 106 are communicatively coupled to the system 100 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 100 through communication links.

The system 100 may be implemented in a workstation, a mainframe computer, a server, and a network server. In an embodiment, the computing device 104 further comprises one or more hardware processors 110, one or more memory 112, hereinafter referred as a memory 112 and a data repository 114, for example, a repository 114. The memory 112 is in communication with the one or more hardware processors 110, wherein the one or more hardware processors 110 are configured to execute programmed instructions stored in the memory 112, to perform various functions as explained in the later part of the disclosure. The repository 114 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the memory 112 comprises a plurality of modules. The plurality of modules is a set of instructions and configured to perform a plurality of functions. The plurality of modules comprises a data extractor unit 116, a model building unit 118 and a blending rules optimizer unit 120, a model selection unit 122, a model retuning unit 124 and a model prediction unit 126.

According to an embodiment of the disclosure, an input data is collected from a plurality of data sources 128 as shown in the functional block diagram of FIG. 2. The plurality of data sources 128 comprises one or more of a Supervisory Control and Data Acquisition (SCADA) system, a Distributed Control System (DCS), an Enterprise Resource Planning (ERP) system, a Laboratory Information and Management System (LIMS), a Manufacturing Execution System (MES), a Manufacturing Operations Management (MOM) System, Historian that contains archival data, etc. The data can also be entered manually by the user/operator using the I/O interface 106. The data extractor unit 116 is configured to extract the relevant information from the plurality of data sources 128. The data extractor unit 116 extracts data from these data sources and provides inputs to the model building unit 118, the model selection unit 122 and the model retuning unit 124. The model building unit 118 is used to create soft-sensors for various properties of interest in the blend as explained in FIG. 4. The model retuning unit 124 retunes the soft-sensors with the addition data as explained using FIG. 9. The model selection unit 122 is used to identify the best or most accurate soft-sensor available in a model database 130. The selection of soft-sensor is based on but not limited to a root mean squared error, mean absolute error, mean absolute percentage error, etc. The model selection unit 122 selects the accurate soft-sensor and passes this information to blending rules optimizer unit 120 that obtains the best mixing rule for each feature of the soft-sensor that is used for predicting the property of a mixture or a blend. The model selection unit 122 selects the accurate soft-sensor and this soft-sensor is used for predicting the property of blend in real-time using the model prediction unit 126.

Figure 3:
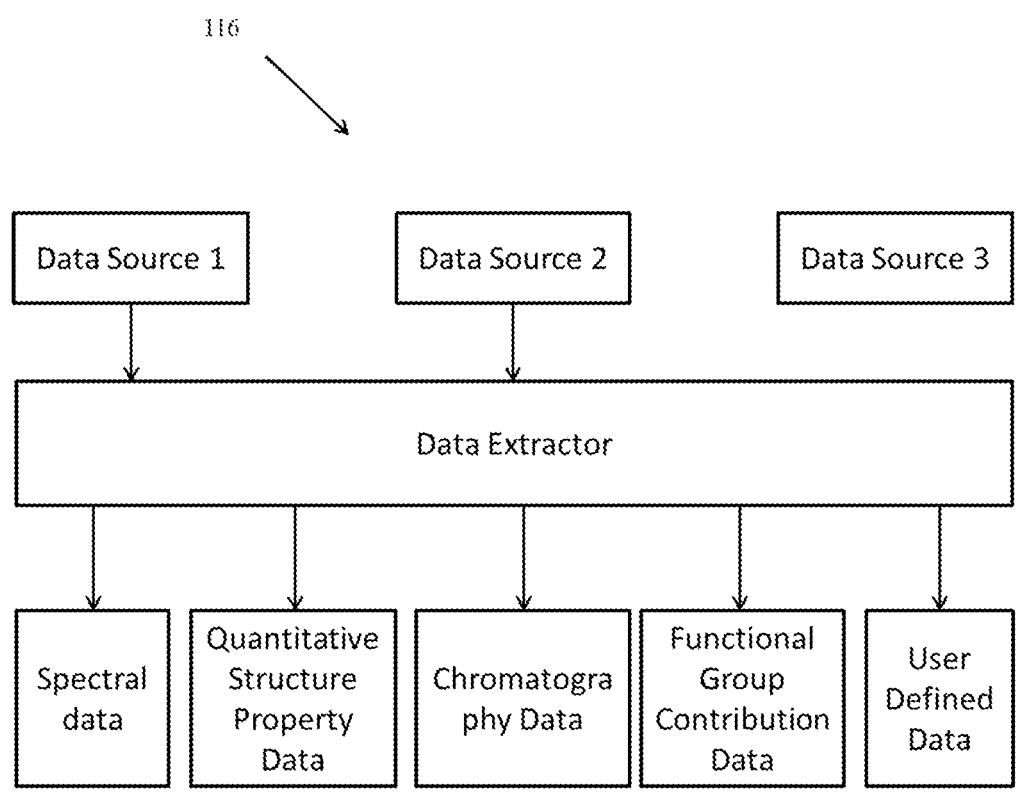
FIG. 3 is a block diagram of a data extractor unit used in the system of FIG. 1 according to some embodiments of the present disclosure.

According to an embodiment of the disclosure, the data extractor unit 116 is configured to extract the relevant information from the plurality of data sources 128 as shown in the block diagram of FIG. 3. The relevant information comprises one or more of: the spectroscopy data obtained from LIMS data, chromatography data obtained from LIMS data, estimating quantitative structure properties for a given molecule, group contribution data for a given molecule, or user defined data that can further be used to build prediction model, flow rate data from distributed control system (DCS) or manufacturing execution system (MES) or Supervisory Control and Data Acquisition (SCADA). In an example, given a molecule name, a molecular structure data can be converted to structure-property data. A simplified molecular input line entry specification (SMILES) is obtained for each molecule in the data base considering complicated cases, such as chirality and configurations around double bonds. Further, the SMILES of each molecule to its unique form using a SMILES translator tool. Further, these unique SMILES are converted into their 3-D structure. These 3-D structures are then optimized to get the final 3-D structure by minimizing the Gibbs free energy. And finally, molecular descriptors (2D and 3D) are generated using the optimized 3D structure. In an example, spectroscopy data from Fourier transform near infrared (FT-NIR) spectrometers that is stored in LIMS, is converted to wavelengths and their corresponding transmittance values. In another example, protein nuclear magnetic resonance (1H-NMR) data that is stored in LIMS is extracted and is converted to chemical shift data.

Figure 4:
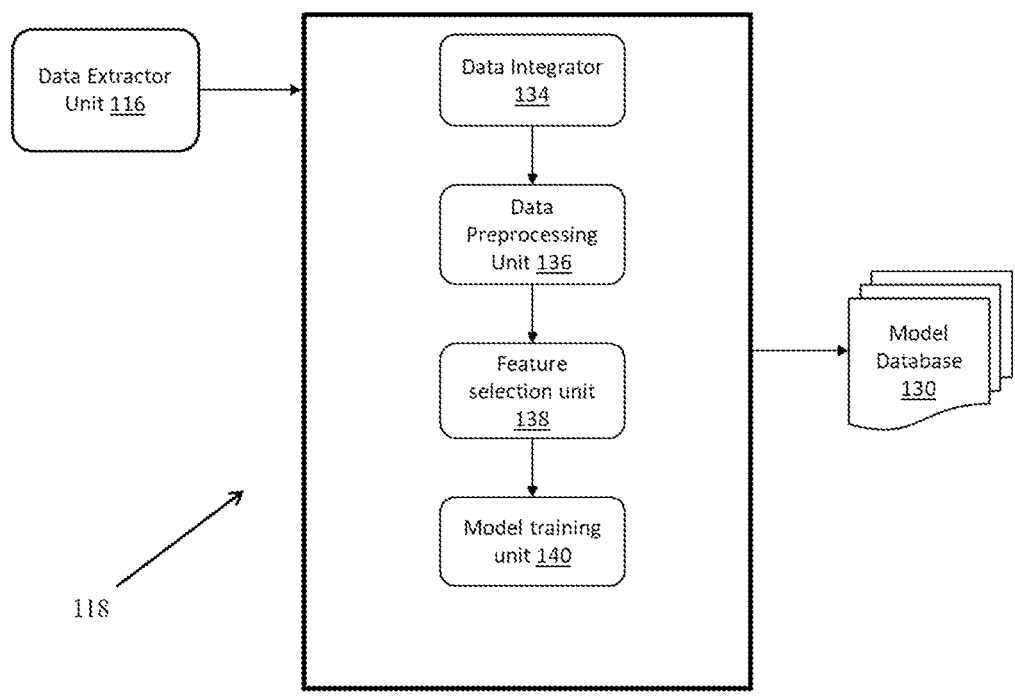
FIG. 4 is a block diagram of a model building unit used in the system of FIG. 1 according to some embodiments of the present disclosure.

According to an embodiment of the disclosure, the model building unit 118 is configured to creating a plurality of soft-sensors for the desired blend property as shown in the block diagram of FIG. 4. A data integrator 134 is used to integrate the data according to the requirement for data preprocessing techniques. The extracted relevant data needs to be preprocessed before using this data as an input to the model building unit 118. A data preprocessing unit 136 of the model building unit 118 applies various preprocessing algorithms to preprocess the data such that the preprocessed data comprises clean data of a plurality of features, wherein the plurality of features is corresponding to the plurality of components that are considered for a blend. The model building unit 118 further comprises a feature selection unit 138 that selects a set of features from the plurality of features using a plurality of feature selection techniques. The use of any standard feature selection technique is well within the scope of this disclosure.

Figure 5:
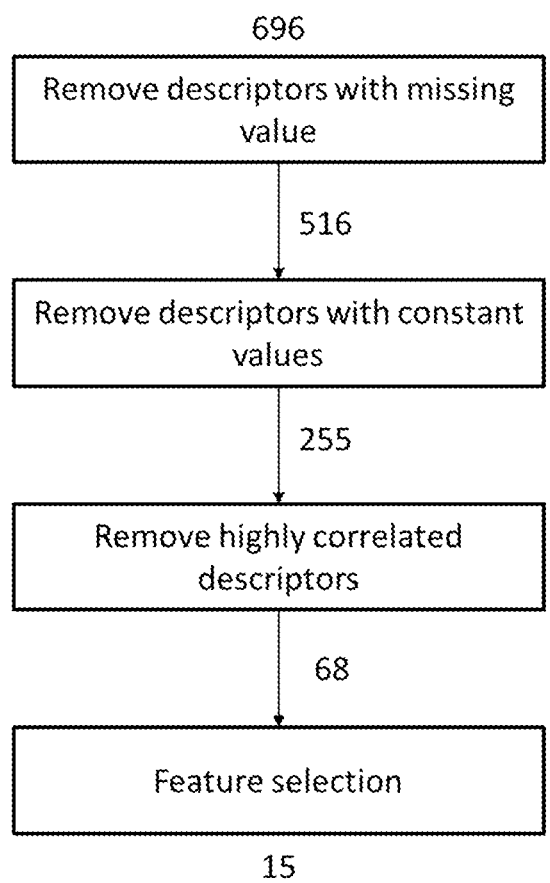
FIG. 5 is a flow diagram showing an example of feature selection used in the model building unit according to some embodiment of the present disclosure.

An example for feature selection is demonstrated in FIG. 5 and is described as follows. For example, the structure-property data extracted from molecular structures of pure components of a blend has 696 features, also called as descriptors in this case. As part of preprocessing, all the descriptors with at least one missing value are ignored for further analysis. 180 such descriptors are removed to obtain a data with 516 descriptors. Descriptors with constant value or a standard deviation of zero are removed to obtain the data with 255 descriptors. Pairwise linearly correlated descriptors are identified by the Pearson correlation coefficient. When the absolute value of the correlation coefficient for two descriptors is greater than or equal to a 0.9, then the two descriptors are matched as a pair, and the one that is highly correlated to all the other descriptors is deleted. Data with of 68 descriptors is left for further analysis. As a part of feature selection process, Random forest algorithm is adapted. Feature selection is performed thrice by setting the number of trees in the forest to 50, 100 and 500. Three sets of features are obtained in each case by sorting the features that explains the 80% variance in the data. An integrated feature set that has features from all the three feature sets is obtained as a final feature set that consists of 15 descriptors. These 15 descriptors or features are as listed in TABLE 1.

TABLE 1

Example showing the final feature set obtained by implementing feature engineering method in the model building unit

| Sl. No. | Description of the descriptor |
|---|---|
| 1 | SP3 carbon bound to 2 other carbons |
| 2 | Rotatable bonds count |
| 3 | Relative positive charge surface area |
| 4 | Mean of constitutional weighted by atomic number |
| 5 | Mean of constitutional weighted by sanderson EN |
| 6 | Fractional charged partial negative surface area |
| 7 | Geometrical shape index |
| 8 | Averaged local ETA composite index for reference graph |
| 9 | Moment of inertia (axis = Z) |
| 10 | SpMax of adjacency matrix |
| 11 | Partial negative surface area |
| 12 | Fractional charged partial positive surface area |
| 13 | Molecular framework ratio |
| 14 | Relative negative charge surface area |
| 15 | averaged molecular ID on C atoms |

Figure 6A:
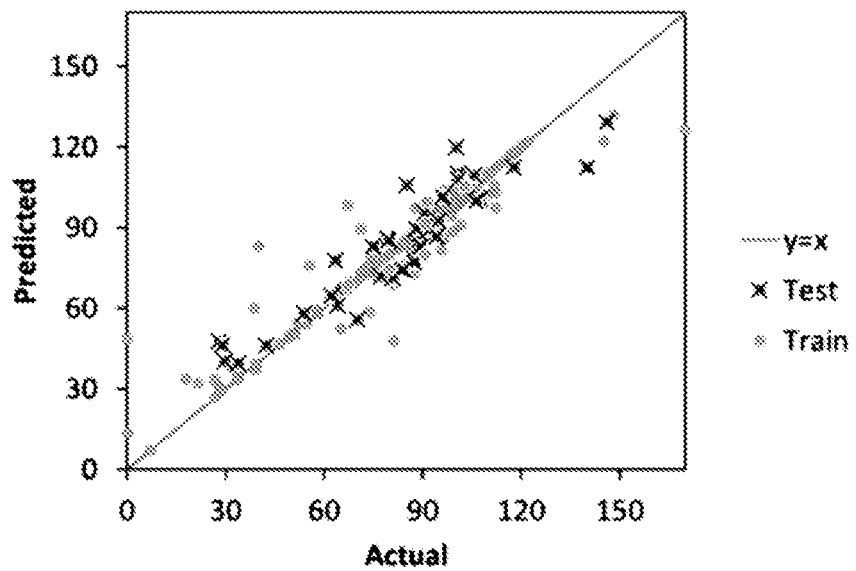
FIGS. 6A and 6B is graphical representation of comparison of soft-sensor predictions with actual data and the density plot of corresponding errors for the data of the components that are used blending according to some embodiment of the present disclosure.
Figure 6B:
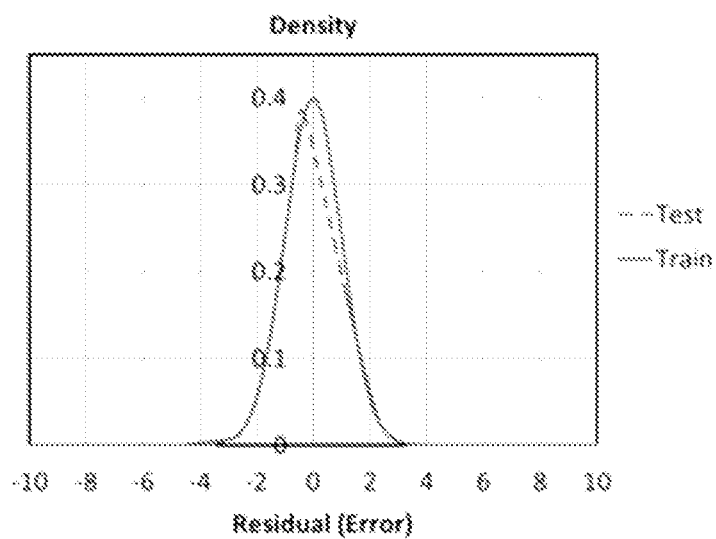

Further, the model building unit 118 comprises a model training unit 140 configured to create a plurality of soft-sensors for the desired property of the plurality of components used for blending using the preprocessed data of the selected set of features. The plurality of soft-sensors is stored in a model database 126. The plurality of soft-sensors is used to predict the desired property of the plurality of components that are used for blending. In an example of the present disclosure, the soft-sensor is built for predicting the desired property using 15 descriptors and the results are as demonstrated in graphical representation of FIG. 6A and 6B. FIG. 6A and 6B shows comparison of soft-sensor predictions with actual data and the density plot of corresponding errors for pure component data. These soft-sensors are considered as soft-sensors for predicting the desired property of the components used in blending process. A soft-sensor is then selected from amongst the plurality of soft-sensors for the desired property of the plurality of components used for blending based on accuracy of the soft-sensors. The accuracy of the soft-sensor is calculated using a plurality of error metrics comprising a mean square error, a root mean square error, a mean absolute error, a mean absolute percentage error, and a hit rate of train, test and validation datasets.

Figure 7:
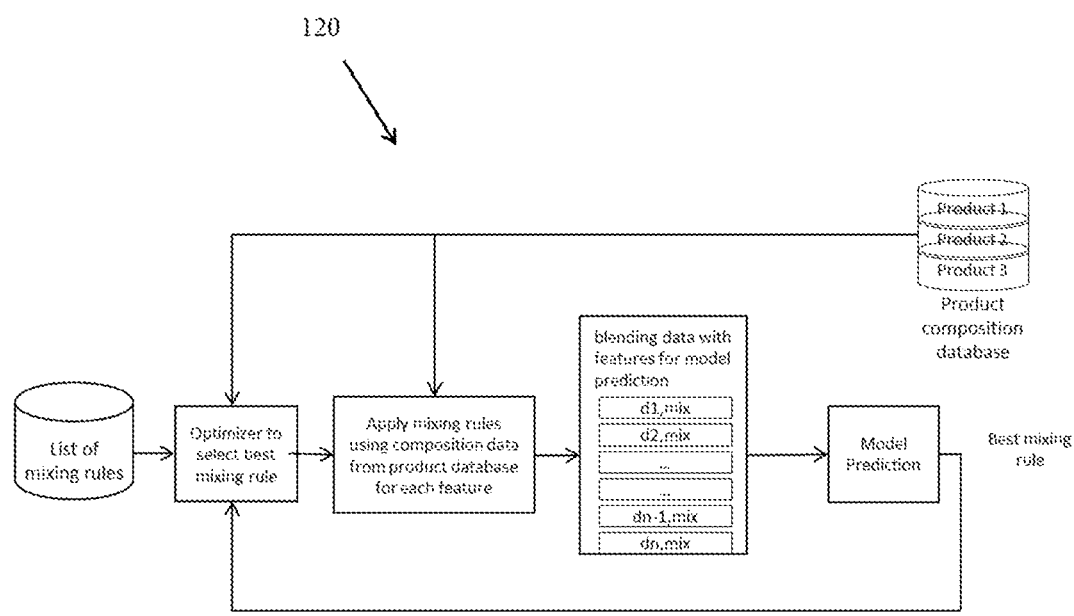
FIG. 7 is block diagram of a blending rule optimizer unit used in the system of FIG. 1 according to some embodiment of the present disclosure.

According to an embodiment of the disclosure, the blending rules optimizer unit 120 is configured to determine the best blending rule corresponding to each feature of the selected set of features as shown in the block diagram of FIG. 7. The set of features obtained earlier cannot be directly used for predicting the desired property of the blend because of two reasons. (1) The features obtained in model building unit for plurality of components used for blending might not be valid or cannot be experimentally obtained for blends. (2) The effect of volume or molar fraction of each component in the blend was not captured in the soft-sensor created using the data from the plurality of components used for blending. A set of blending rules for each feature of the selected set of features are identified. The blending rules optimizer unit 120 is configured to determine the best blending rule from amongst the set of blending rules corresponding to each feature of the selected set of features. The set of blending rules are present in a blending rules database 132. The best blending rule for each feature is obtained such that the selected soft-sensor can be used to predict the desired blend property while considering the quantity of each component in the blend. The best blending rule is determined using an optimization technique, the optimization technique comprises: predicting the blend property for each blending rule of the set of blending rules for each feature of the soft-sensor used to predict the blend property, and comparing the predicted blend properties with the desired blend property, and minimizing an error in prediction of the blend property to select the best blending rule. The best blending rule is the used to build the blend with the desired property.

In an example, following mixing rules were considered for optimization:

$$d_{mix} = \sum_{i=1}^{M} x_i d_i \qquad 1.$$

$$d_{mix} = \sqrt{\sum_{i=1}^{M} x_i d_i^2} \qquad 2.$$

$$d_{mix} = \sqrt[3]{\sum_{i=1}^{M} x_i d_i^3} \qquad 3.$$

-continued

4. $d_{mix} = \left(\sum_{i=1}^{M} x_i d_i\right)^2$

5. $d_{mix} = \sqrt{\sum_{i=1}^{M} (x_i d_i)^2}$

6. $d_{mix} = \sum_{i=1}^{M} \sqrt{x_i} \, d_i$

7. $d_{mix} = \sum_{i=1}^{M} \sqrt{|d_i|}$

8. $d_{mix} = \sum_{i=1}^{M} x_i (d_i)^2$

9. $d_{mix} = \sum_{i=1}^{M} (x_i)^2 d_i$

10. $d_{mix} = \sqrt[3]{\sum_{i=1}^{M} x_i^3 d_i}$

11. $d_{mix} = \frac{\sum_{i=1}^{M} d_i}{M}$

Figure 8A:
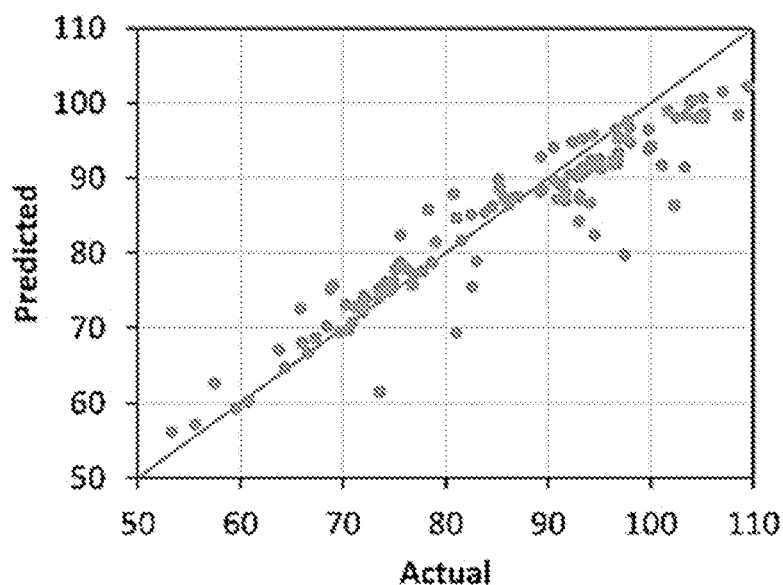
FIGS. 8A and 8B is graphical representation of comparison of soft-sensor predictions with actual data and the density plot of corresponding errors for mixture/blend data with optimized blending rules according to some embodiment of the present disclosure.
Figure 8B:
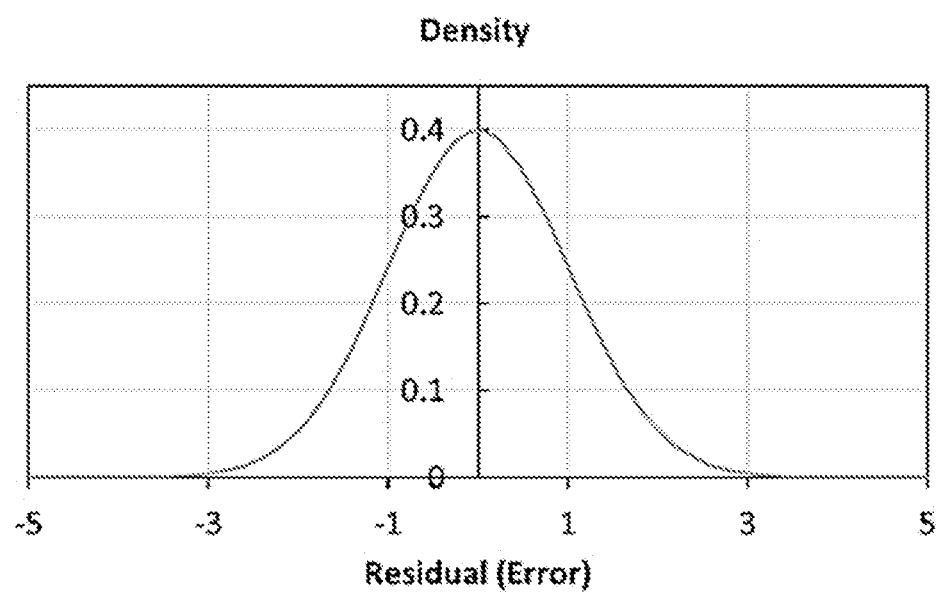

After optimization, the best blending rule for each feature of pure component model is as described in TABLE 2. FIG. 8A and 8B shows the comparison of soft-sensor predictions with actual data and the density plot of corresponding errors for mixture/blend data with optimized blend rules. TABLE 3 describes the performance metric of the soft-sensor when implemented on mixture data and pure component data.

TABLE 2

Example showing best blending rule obtained for each feature of pure component model

| Descriptor name | Best mixing rule |
|---|---|
| SP3 carbon bound to 2 other carbons | $d_{mix} = \sqrt{\sum_{i=1}^{M} (x_i d_i)^2}$ |
| Rotatable bonds count | $d_{mix} = \left(\sum_{i=1}^{M} x_i d_i\right)^2$ |
| Relative positive charge surface area | $d_{mix} = \sum_{i=1}^{M} \sqrt{x_i} \, d_i$ |
| Mean of constitutional weighted by atomic number | $d_{mix} = \frac{\sum_{i=1}^{M} d_i}{M}$ |
| Mean of constitutional weighted by sanderson EN | $d_{mix} = \sum_{i=1}^{M} x_i d_i$ |
| Fractional charged partial negative surface area | $d_{mix} = \sqrt{\sum_{i=1}^{M} (x_i d_i)^2}$ |
| Geometrical shape index | $d_{mix} = \sum_{i=1}^{M} x_i d_i$ |
| Averaged local ETA composite index for reference graph | $d_{mix} = \sum_{i=1}^{M} x_i d_i$ |
| Moment of inertia (axis = Z) | $d_{mix} = \sqrt{\sum_{i=1}^{M} x_i d_i^2}$ |
| SpMax of adjacency matrix | $d_{mix} = \sum_{i=1}^{M} x_i d_i$ |

TABLE 2-continued

Example showing best blending rule obtained for each feature of pure component model

| Descriptor name | Best mixing rule |
|---|---|
| Partial negative surface area | $d_{mix} = \sum_{i=1}^{M} x_i d_i$ |
| Fractional charged partial positive surface area | $d_{mix} = \left(\sum_{i=1}^{M} x_i d_i\right)^2$ |
| Molecular framework ratio | $d_{mix} = \sqrt{\sum_{i=1}^{M} (x_i d_i)^2}$ |
| Relative negative charge surface area | $d_{mix} = \sqrt[3]{\sum_{i=1}^{M} x_i d_i^3}$ |
| averaged molecular ID on C atoms | $d_{mix} = \sqrt[3]{\sum_{i=1}^{M} x_i d_i^3}$ |

TABLE 3

Comparison of accuracy of pure component soft-sensor with blend data

| Metric | For Mixtures | Pure component soft-sensor metrics (Train/Test) | |
|---|---|---|---|
| Mean Absolute Error (MAE) | 3.41 | 3.68 | 7.23 |
| Root mean square error (RMSE) | 5.00 | 8.61 | 9.39 |
| $R^2$ | 0.87 | 0.90 | 0.86 |

Figure 9:
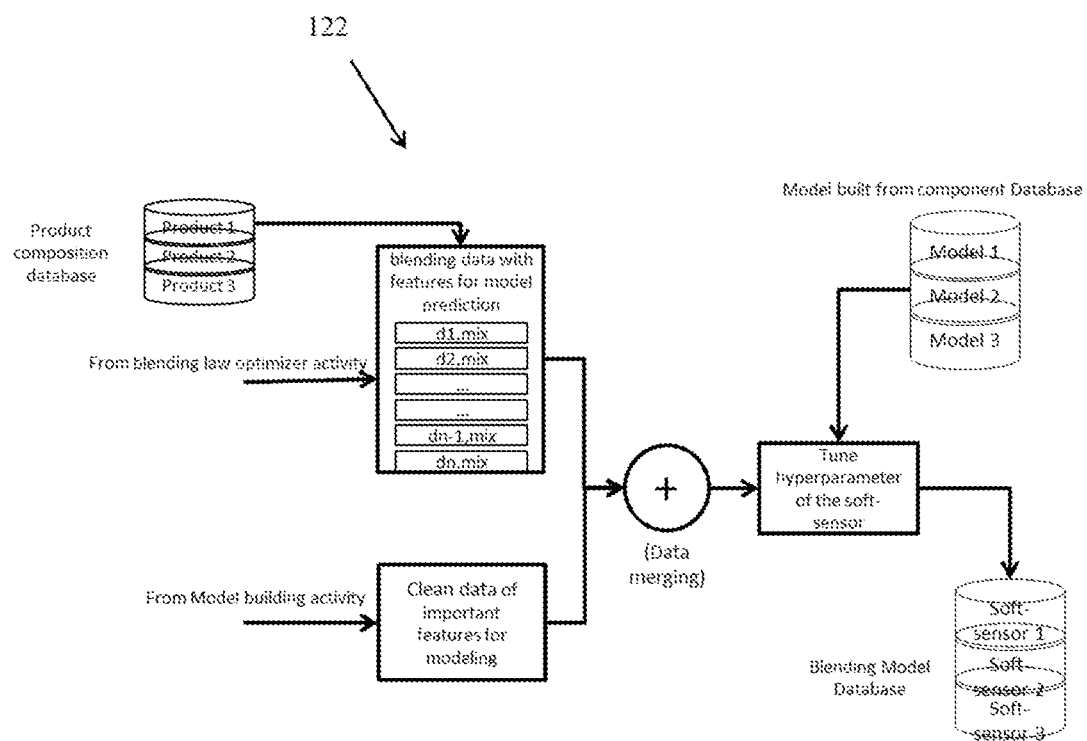
FIG. 9 is a block diagram of a model retuning unit used in the system of FIG. 1 according to some embodiment of the present disclosure.

According to an embodiment of the disclosure, the system 100 also comprises the model retuning unit 124 as shown in the block diagram of FIG. 9. Although the blending rules are obtained such that the soft-sensor created using data of the plurality of components used in blending is made valid for predicting the blend property of mixture of components, there is still scope for improving the accuracy and validity of the soft-sensor when used for predicting the blend property. Therefore, the hyper-parameters of the soft-sensor obtained using data from the plurality of components used in blending are tuned within their individual tolerances such that the overall accuracy of the soft-sensor increases when the blend data and component data are combined with each other.

The model developed for predicting the properties of components used in the blend is considered as a soft-sensor for predicting the property of interest. The same soft-sensor is also used to predict the property of interest of the blend with mixture of components after obtaining the best blending rule for each feature used in the soft-sensor. This soft-sensor uses volume percentage of each component and their corresponding values of the feature set to predict the blend property. As the soft-sensor is finalized for monitoring the blend property, this soft-sensor further finds its use in optimizing the blend composition by manipulating the volume percentage of each component in the blend. The volume percentage of each component is changed by recommending the optimal flow rate data back to the DCS.

The system and method provided in the disclosure, in principle, can also be extended to other industries where multiple components are mixed to form a blend with a desired property. The method of creating the soft-sensor for predicting the property of the components used in blending process and method of optimizing blending rules for each set of features used in creating the soft-sensor still remains the same. For example, in a pharmaceutical industry, small amounts of a powdered active drug are carefully blended with excipients such as starch, cellulose, lactose, and lubricants to obtain the final product. Similarly, in a food industry, many powdered consumer products result from custom mixed batches that are blend of many fine spices. The desired property of the blend is modeled based on data from individual components such as starch, lactose etc. where the soft-sensor predicts the property of these individual components. Using optimization module, the optimal blending rule for each feature used in the soft-sensor are obtained such that soft-sensor is valid for mixture of these components.

Figure 10:
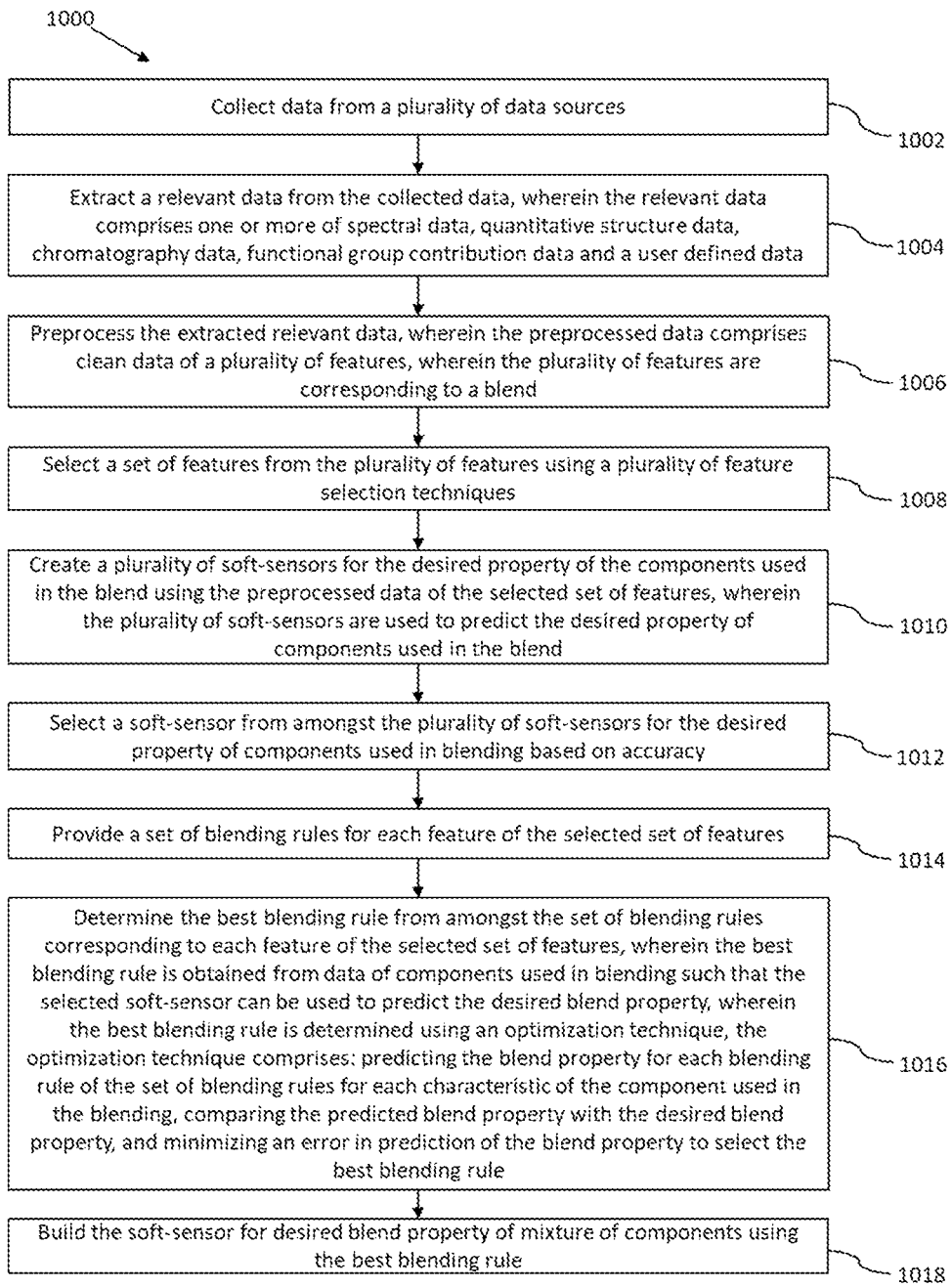
FIG. 10 is a flowchart illustrating a method for getting desired property of a blend by optimizing a set of blending rules in accordance with some embodiments of the present disclosure.

In operation, referring to FIG. 10, flow diagram of a method 1000 for getting desired property of a blend by optimizing a set of blending rules is described in accordance with an example embodiment. The method 1000 depicted in the flow chart may be executed by a system, for example, the system, 100 of FIG. 1. In an example embodiment, the system 100 may be embodied in the computing device as explained above.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 1000 are described with help of system 100. However, the operations of the method 1000 can be described and/or practiced by using any other system.

Initially at step 1002 of the method 1000, data is collected from a plurality of data sources. At step 1004, the relevant data is extracted from the collected data. The relevant data comprises one or more of spectral data, quantitative structure data, chromatography data, functional group contribution data and the user defined data.

At step 1006 of the method 1000, the extracted relevant data is then preprocessed. The preprocessed data comprises clean data of a plurality of features, wherein the plurality of features is corresponding to the blend. At step 1008, a set of features is selected from the plurality of features using a plurality of feature selection techniques.

Further at step 1010 of the method 1000, a plurality of soft-sensors is created for the desired property of the plurality of components used in blending using the preprocessed data of the selected set of features. The plurality of soft-sensors is used to predict the desired property of the plurality of components used in the blending. At step 1012, a soft-sensor is selected from amongst the plurality of soft-sensors for the desired property of the plurality of components used in blending based on accuracy. The accuracy of the soft-sensor is calculated using a plurality of error metrics comprising a mean square error, a root mean square error, a mean absolute error, a mean absolute percentage error, and a hit rate of train, test and validation datasets. Further at step 1014, a set of blending rules is provided for each feature of the selected set of features. The set of blending rules is chosen by a user.

At step 1016 of the method 1000, the best blending rule is determined from amongst the set of blending rules corresponding to each feature of the selected set of features. The best blending rule is obtained from data of components used in blending such that the selected soft-sensor can be used to predict the desired blend property of mixture of components. The best blending rule is determined using an optimization technique, the optimization technique comprises: predicting the blend property for each blending rule of the set of blending rules for each feature of the soft-sensor used to predict the blend property and comparing the predicted blend properties with the desired blend property, and minimizing an error in prediction of the blend property to select the best blending rule. And finally, at step 1018, the soft-sensor is built for the desired property of mixture of components using the best blending rule.

According to an embodiment of the disclosure, the set of parameters of the selected soft-sensor obtained using data from individual components and blend data within their individual tolerances after optimizing for the plurality of blending rules can be tuned such that the overall accuracy of the soft-sensor increases when the blend data and component data are combined.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problems of identifying a best blending rule while blending of the plurality of components in the refineries such that desired property is obtained. The embodiment thus provides method and system for getting desired property of the blend of the plurality components to be used in the refinery by optimizing a set of blending rules.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for getting a desired property of a blend by optimizing a set of blending rules, the method comprising:
   collecting, via one or more hardware processors, data from a plurality of data sources;
   extracting, via the one or more hardware processors, a relevant data from the collected data, wherein the relevant data comprises one or more of spectral data, quantitative structure data, chromatography data, functional group contribution data and a user defined data;
   preprocessing, via the one or more hardware processors, the extracted relevant data, wherein the preprocessed data comprises clean data of a plurality of features, wherein the plurality of features are corresponding to the blend;
   selecting, via the one or more hardware processors, a set of features from the plurality of features using a plurality of feature selection techniques;
   creating, via the one or more hardware processors, a plurality of soft-sensors for the desired blend property using the preprocessed data of the selected set of features, wherein the plurality of soft-sensors is used to predict the desired property of a plurality of components used for blending;
   selecting, via the one or more hardware processors, a soft-sensor from amongst the plurality of soft-sensors for the desired property of the plurality of components used for blending based on accuracy;
   providing, via the one or more hardware processors, the set of blending rules for each feature of the selected set of features;
   determining, via the one or more hardware processors, best blending rule from amongst the set of blending rules corresponding to each feature of the selected set of features, wherein the best blending rule is obtained from data of components used for blending such that the selected soft-sensor can be used to predict the desired blend property of mixture of components, wherein the best blending rule is determined using an optimization technique, the optimization technique comprises:
      predicting the blend property for each blending rule of the set of blending rules for each feature of the soft-sensor used to predict the blend property of the components used in the blend,
      comparing the predicted blend property with the desired blend property, and
      minimizing an error in prediction of the blend property to select the best blending rule; and
   building, via the one or more hardware processors, the soft-sensor for the desired blend property using the best blending rule.

2. The method of claim 1 further comprising tuning a set of parameters of the selected soft-sensor obtained using data from the plurality of components used for blending and the data from the blend within their individual tolerances after optimizing the plurality of blending rules such that an overall accuracy of the soft-sensor increases when the blend data and component data are combined.

3. The method of claim 1 wherein the plurality of data sources comprises one or more of a Supervisory Control and Data Acquisition (SCADA) system, a Distributed Control System (DCS), an Enterprise Resource Planning (ERP) system, a Laboratory Information and Management System (LIMS), a Manufacturing Execution System (MES), a Manufacturing Operations Management (MOM) System.

4. The method of claim 1 further comprising preprocessing by removing redundant, outlier and correlated data, and removing data of features for which there is no variance.

5. The method of claim 1, wherein the relevant data is obtained from one or more of: a spectroscopy data obtained from the LIMS data, a chromatography data obtained from the LIMS data, estimated quantitative structure properties for a given molecule, group contribution data for a given molecule, user defined data that can further be used to build prediction model, or flow rate data obtained from DCS or MES or SCADA.

6. The method of claim 1, wherein the plurality of feature selection techniques comprises one or more of a random forest algorithm, and a support vector machine algorithm.

7. The method of claim 1, wherein the accuracy of the soft-sensor is calculated using a plurality of error metrics comprising a mean square error, a root mean square error, a mean absolute error, a mean absolute percentage error, and a hit rate of train, test and validation datasets.

8. The method of claim 1, wherein the blend property comprises one or more of Octane number, volatility (RVP), viscosity, flash point, an aniline point, and Sulphur content.

9. The method of claim 1, wherein the objective function in the optimization is mathematical function that provides the deviation of the estimated soft-sensor property from the actual blend property for a given set of input data.

10. A system for getting a desired property of a blend by optimizing a set of blending rules, the system comprises:
an input/output interface configured to provide data from a plurality of data sources;
one or more hardware processors;
a memory in communication with the one or more hardware processors, wherein the one or more first hardware processors are configured to execute programmed instructions stored in the memory, to:
extract a relevant data from the collected data, wherein the relevant data comprises one or more of spectral data, quantitative structure data, chromatography data, functional group contribution data and a user defined data;
preprocess the extracted relevant data, wherein the preprocessed data comprises clean data of a plurality of features, wherein the plurality of features is corresponding to the blend;
select a set of features from the plurality of features using a plurality of feature selection techniques;
create a plurality of soft-sensors for the desired blend property using the preprocessed data of the selected set of features, wherein the plurality of soft-sensors is used to predict the desired property of a plurality of components used for blending;
select a soft-sensor from amongst the plurality of soft-sensors for the desired property of the plurality of components used for blending based on accuracy;
provide the set of blending rules for each feature of the selected set of features;
determine the best blending rule from amongst the set of blending rules corresponding to each feature of the selected set of features, wherein the best blending rule is obtained from data of the plurality of components used for blending such that the selected soft-sensor can be used to predict the desired blend property of mixture of components, wherein the best blending rule is determined using an optimization technique, the optimization technique comprises:
predicting the blend property for each blending rule of the set of blending rules for each feature of the soft-sensor used to predict the blend property of the components used in the blend,
comparing the predicted blend property with the desired blend property, and
minimizing an error in prediction of the blend property to select the best blending rule; and
build the soft-sensor with the desired blend property using the best blending rule.

11. The system of claim 10 further configured to tune a set of parameters of the selected soft-sensor obtained using data from the plurality of components used for blending and the data from the blend within their individual tolerances after optimizing for the plurality of blending rules such that an overall accuracy of the soft-sensor increases when the blend data and component data are combined.

12. The system of claim 10 wherein the plurality of data sources comprises one or more of a Supervisory Control and Data Acquisition (SCADA) system, a Distributed Control System (DCS), an Enterprise Resource Planning (ERP) system, a Laboratory Information and Management System (LIMS), a Manufacturing Execution System (MES), and a Manufacturing Operations Management (MOM) System.

13. The system of claim 10, wherein the plurality of feature selection techniques comprises one or more of random forest algorithm, and support vector machine algorithm.

14. The system of claim 10, wherein the accuracy of the soft-sensor is calculated using a plurality of error metrics comprising a mean square error, a root mean square error, a mean absolute error, a mean absolute percentage error, and a hit rate of train, test and validation datasets.

15. The system of claim 10, wherein the objective function in the optimization is mathematical function that provides the deviation of estimated soft-sensor property from the actual blend property for a given set of input data.

16. One or more non-transitory machine-readable information storage mediums comprising one or more instructions which when executed by one or more hardware processors cause:
collecting, data from a plurality of data sources;
extracting, via the one or more hardware processors, a relevant data from the collected data, wherein the relevant data comprises one or more of spectral data, quantitative structure data, chromatography data, functional group contribution data and a user defined data;
preprocessing, via the one or more hardware processors, the extracted relevant data, wherein the preprocessed data comprises clean data of a plurality of features, wherein the plurality of features are corresponding to a blend;
selecting, via the one or more hardware processors, a set of features from the plurality of features using a plurality of feature selection techniques;
creating, via the one or more hardware processors, a plurality of soft-sensors for the desired blend property using the preprocessed data of the selected set of features, wherein the plurality of soft-sensors is used to predict the desired property of a plurality of components used for blending;
selecting, via the one or more hardware processors, a soft-sensor from amongst the plurality of soft-sensors for the desired property of the plurality of components used for blending based on accuracy;
providing, via the one or more hardware processors, a set of blending rules for each feature of the selected set of features;
determining, via the one or more hardware processors, best blending rule from amongst the set of blending rules corresponding to each feature of the selected set of features, wherein the best blending rule is obtained from data of components used for blending such that the selected soft-sensor can be used to predict the desired blend property of mixture of components, wherein the best blending rule is determined using an optimization technique, the optimization technique comprises:
predicting the blend property for each blending rule of the set of blending rules for each feature of the soft-sensor used to predict the blend property of the components used in the blend, comparing the predicted blend property with the desired blend property, and minimizing an error in prediction of the blend property to select the best blending rule; and building, via the one or more hardware processors, the soft-sensor for the desired blend property using the best blending rule.

* * * * *